United States Patent [19]
Nielsen

[11] Patent Number: 5,583,412
[45] Date of Patent: Dec. 10, 1996

[54] APPARATUS AND METHOD FOR CONTROLLING THE DECELERATION OF AN ELECTRIC MOTOR

[75] Inventor: Henrik B. Nielsen, Germantown, Wis.

[73] Assignee: Allen-Bradley Company, Inc., Milwaukee, Wis.

[21] Appl. No.: 395,764

[22] Filed: Feb. 28, 1995

[51] Int. Cl.$^6$ .................................................. H02P 3/18
[52] U.S. Cl. .......................... 318/811; 318/368; 318/757; 363/37; 363/74; 323/299
[58] Field of Search ..................................... 318/459, 478, 318/479, 368, 801, 805, 807, 808, 810, 811, 812, 757; 363/34, 37, 74; 323/234, 299

[56] References Cited

U.S. PATENT DOCUMENTS

| | | |
|---|---|---|
| 4,150,734 | 4/1979 | Ohira et al. . |
| 4,532,464 | 7/1985 | Igarashi et al. ........................ 318/807 |
| 4,876,637 | 10/1989 | Mose et al. ......................... 318/811 X |
| 5,481,451 | 1/1996 | Kuwahara ........................... 318/801 X |

*Primary Examiner*—Bentsu Ro
*Attorney, Agent, or Firm*—Patrick S. Yoder; John M. Miller; John J. Horn

[57] ABSTRACT

A motor drive particularly suited for decelerating an AC motor includes a signal converting circuit, a monitoring circuit and a control circuit. The signal converting circuit is coupled to a source of DC power via a DC bus and a capacitive circuit is coupled across the DC bus to store energy produced by the motor during deceleration of a primarily inertial load. The signal converting circuit produces and applies drive signals to the motor based on control signals from the control circuit. The control circuit produces control signals for generating an output waveform duty cycle for the drive signals suitable for maintaining a predetermined voltage-to-frequency relationship. The frequency of the output signals is selectable to control the output speed of the motor. During deceleration, the monitoring circuit detects rises in the DC bus voltage, indicating that the motor is tending to slow at a rate less than the desired deceleration rate. In response to the rise in DC bus voltage above a predetermined level, the control circuit causes the output voltage to the motor to rise, thereby braking the motor to the desired deceleration rate.

15 Claims, 6 Drawing Sheets

APPARATUS AND METHOD FOR CONTROLLING THE DECELERATION OF AN ELECTRIC MOTOR

BACKGROUND OF THE INVENTION

1. Field of the Invention

The present invention relates generally to the field electric motor controls. More particularly, the invention relates to a variable frequency motor drive capable braking and controlling the deceleration of an electric motor.

2. Description of the Prior Art

Since their inception a number of years ago, variable speed, alternating current (AC) motor drives have gained tremendous acceptance for a wide range of industrial applications. These devices now serve as primary drivers for such machines as pumps, conveyors and material handling equipment, replacing other drive systems such as direct current motors and mechanical or electromechanical variable speed drive devices. As the quality and availability of the components of variable speed AC drives has improved, particularly of semiconductor components such as microprocessors, these drives have become even more economical and reliable.

The popularity of variable speed AC drives, and adjustable frequency drives in particular, has been due, in part, to their ease of installation and use. Widely available drives may be installed and connected between a polyphase or single phase power source and a conventional AC motor. Properly programmed, such drives enable an operator to simply select a desired output speed, acceleration rate and deceleration rate, and to limit current and voltage applied to the motor in accordance with specifications supplied by the motor manufacturer. Moreover, available interfaces permit these functions to be easily automated, such as in a computerized manufacturing or process control system wherein the speeds of one or more motors are set and controlled automatically as required by the control system.

Known adjustable frequency AC motor drives are generally designed to control the output speed of polyphase induction motors. Because the synchronous or steady state speed of such motors is dependent upon and directly proportional to the frequency of their input current, their speed may be selectively varied by controlling the supply current frequency. The voltage applied to the motor is generally varied proportionately with the frequency such that their maximum values are reached at the rated voltage and frequency of the motor. In one known technique, the output voltage for each AC phase is controlled by generating a pulse-width-modulated (PWM) voltage waveform corresponding to the output voltage level desired. Moreover, the output current applied to the motor is varied, up to the rated motor current limit, to supply the necessary torque to drive the motor load while maintaining the desired output speed characteristics. In addition to controlling the final motor speed, such drives typically include algorithms for controlling acceleration and deceleration of the motor by increasing or decreasing the driving frequency and voltage at a desired or target rate.

While motor drives of this type have proven extremely useful in driving conventional motors at desired speeds, they do not always provide satisfactory transient characteristics, particularly during deceleration of inertial loads. Where a motor is coupled to a primarily frictional load, i.e. a load that inherently tends to decelerate at a rate greater than the desired rate, the device effectively drives the load constantly such that the load slows at the desired rate. On the other hand, inertial loads, i.e. those that tend to decelerate at a rate below the desired rate, are not adequately slowed and may require braking to slow them to the desired speed at the desired deceleration rate. Such braking may typically be provided by dynamic brake resistors designed to absorb energy generated by the motor during deceleration. However, such techniques add expense and bulk to the drive package. Moreover, other known braking techniques, such as DC braking, while effective at stopping a motor, do not offer satisfactory control of deceleration rate and are not suited to deceleration from one speed to another without ultimately stopping the motor.

The present invention is intended to respond to these shortcomings of known motor drives. In particular, the invention provides an adjustable frequency AC motor drive system capable of decelerating inertial as well as frictional loads at a controlled rate upon demand. Moreover, there is a need for a drive system which affords controlled deceleration in a motor drive that is both competitive with existing drive packages and compatible with conventional AC motors.

SUMMARY OF THE INVENTION

The invention features a novel apparatus and method permitting the controlled deceleration of an electric motor and the load coupled to the motor. In accordance with a first aspect of the invention, a variable frequency drive is provided for an alternating current electric motor. The drive includes a signal converting circuit having input lines for coupling to a direct current source and output lines for coupling to an electric motor. The signal converting circuit generates variable frequency and variable voltage output signals to drive the motor at desired speeds. A capacitive circuit is coupled across the input lines for storing energy produced by the motor. A voltage monitoring device is coupled across the input lines for measuring the voltage difference between the input lines. A control circuit is coupled to the signal converting circuit and to the monitoring device. The control circuit monitors the voltage difference measured by the monitoring device and generates control signals. The control signals are applied to the signal converting circuit to increase the voltage of the output signals when the voltage difference rises above a predetermined level.

The invention also features a novel method for decelerating an electric motor coupled to a control system. The control system includes a DC bus coupled to a direct current source and a signal converting circuit coupled to the direct current bus for generating drive signals to drive the motor. The control system also includes a capacitive circuit coupled to the DC bus for storing energy produced by the motor and a monitoring circuit coupled to the DC bus for measuring the DC bus voltage. A control circuit is coupled to the monitoring circuit and to the signal converting circuit. The control circuit generates command signals and applies the control signals to the signal converting circuit for selectively controlling the frequency and voltage of the drive signals. The method includes the steps of monitoring the DC bus voltage, reducing the frequency of the drive signals to decelerate the motor and increasing the voltage of the drive signals in response to an increase in the DC bus voltage above a predetermined level.

In accordance with a further aspect of the invention, a method is provided for controlling the speed of an electric motor coupled to a control system. The control system includes a signal converting circuit for generating drive signals in response to control signals and for applying the drive signals to the motor. A monitoring circuit detects and measures an operating parameter of the motor representative of the motor speed and produces a parameter signal representative thereof. A control circuit coupled to the signal converting circuit and to the monitoring circuit generates control signals and applies the control signals to the signal converting circuit for selectively controlling the frequency and voltage of the drive signals. The method includes the steps of reducing the frequency of the drive signals at a predetermined rate to decelerate the motor, monitoring the parameter signal and increasing the voltage of the drive signals when the parameter signal indicates that the motor is tending to decelerate at a rate less than the predetermined rate.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENTS

Before proceeding to the Detailed Description of the Preferred and Alternate Embodiments, several general comments can be made about the applicability and the scope of the invention. While the invention is particularly suited for applications where the load is or could become inertial, thereby resisting deceleration, it may be incorporated into general purpose drives and actuated automatically when the drive controller recognizes the inertial nature of the load during deceleration. Moreover, although the following description refers to a specific application of the present drive to control a three-phase motor, the invention may be more generally applicable to both polyphase and single phase motors where controlled deceleration is desired.

Figure 1:
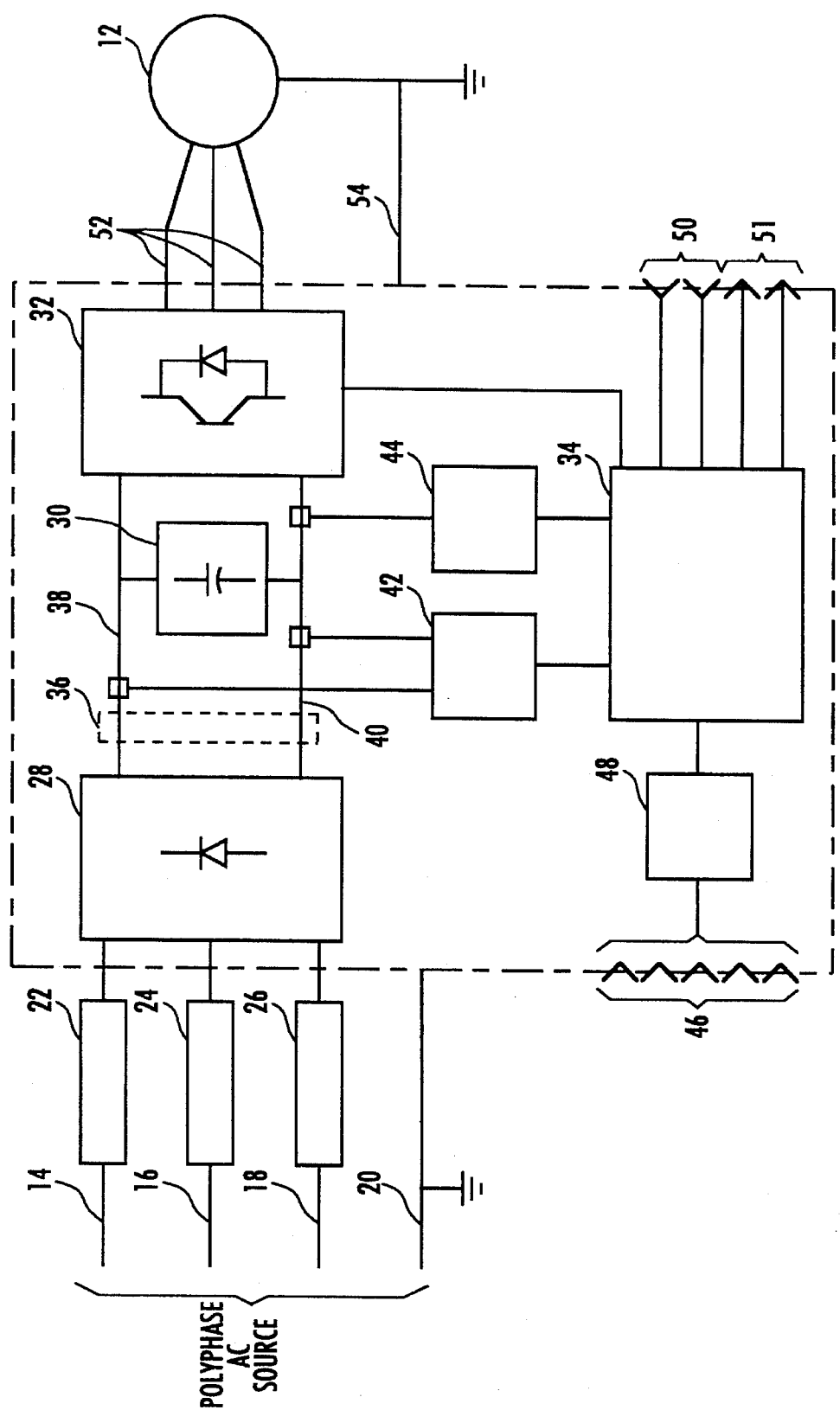
FIG. 1 is a schematic block diagram of a typical motor control system in which the invention is incorporated.

Turning now to the drawings and referring first to FIG. 1, a motor drive control system 10 is illustrated diagramatically as it would be installed for driving an electric motor 12 as desired speeds. Thus installed, system 10 is coupled to phase conductors 14, 16, 18 and a ground conductor 20 via protective circuits, typically including fuses 22, 24, 26. Control system 10 includes a number of interconnected circuits, preferably configured within a unitary drive package. As illustrated in FIG. 1, system 10 includes a rectifying circuit 28, a capacitive circuit 30, a signal converting circuit 32 and a control circuit 34. Rectifying circuit 28, capacitive circuit 30 and signal converting circuit 32 may be of types generally known in the art, such as the circuits incorporated in the Bulletin 1305 motor drives available from the Allen-Bradley Company of Milwaukee, Wis.

In the present embodiment of system 10, control circuit 34 is a microprocessor (digital processor) that includes an analog-to-digital converter (not shown) as a circuit which is integral to the microprocessor. Control circuit 34 also includes memory circuits (not shown), such as RAM and ROM (e.g. EPROM), that may be internal or external to the microprocessor. Programming that controls the microprocessor is stored in ROM, while the microprocessor utilizes RAM to temporarily store variable data which is utilized during the execution of the programs stored in ROM. The analog-to-digital converter converts analog signals (e.g. parameter signals) received by control circuit 34, as discussed below, to digital data representative of these signals. Accordingly, the analog-to-digital converter produces real-time digital data at a predetermined sampling interval which is representative of parameter signals communicated to control circuit 34.

Rectifying circuit 28 is coupled to incoming phase conductors 14, 16, 18 and includes circuitry for converting alternating current power from the incoming phase conductors to direct current power. Rectifying circuit 28 thus acts as a direct current source within system 10, supplying DC power to signal converting circuit 32 via a DC bus 36 including signal converting circuit input lines 38 and 40. Signal converting circuit 32 receives DC power from bus 36 and includes circuitry, preferably including solid state switching elements (not shown), for generating pulsed power signals at desired, variable frequencies for driving motor 12.

A bus voltage monitoring circuit 42 is coupled across lines 38 and 40 of DC bus 36 and includes circuitry for measuring the DC voltage difference between lines 38 and 40 and for producing a signal, Vdc, representative of the DC bus voltage. Voltage monitoring circuit 42 is, in turn, coupled to control circuit 34 and provides the DC bus voltage signal Vdc to the control circuit for control of motor 12 as described below. A bus voltage current monitoring circuit 44 is also coupled to DC bus 36 and includes circuitry for measuring the current flowing through DC bus 36 and producing a signal representative thereof, which is in turn applied to control circuit 34.

In addition to inputs from voltage and current monitoring circuits 42 and 44, control circuit 34 is typically coupled to a number of input channels, designated generally by the reference numeral 46. Channels 46 may receive incoming signals from such external elements as start and stop circuits, reverse and jog switches and the like, typically arranged in a control terminal block (not shown). Such inputs are communicated to control circuit 34, preferably through an opto-isolating circuit 48 for protecting control circuit 34 from power surges. Moreover, control circuit 34 receives input signals through one or more ports 50. One such port 50 is generally coupled to a command input device, such as a potentiometer (not shown), for generating and supplying control circuit 34 with a target or desired output speed or frequency level, represented by the value Fd. Other ports 50 may be provided for various programming and control interface devices, such as a handheld human interface module (not shown) or a digital computer data link. One or more output or monitoring ports 51 are preferably linked to control circuit 34, along with appropriate analog circuitry, for selectively monitoring the various operating parameters of system 10, such as the desired and actual frequency or speed outputs.

Control circuit 34 is coupled to signal converting circuit 32 both for receiving signals from circuit 32 and for communicating control signals, designated generally Uo, to circuit 32 to drive motor 12. In response to the control signals, signal converting circuit 32 generates pulsed drive signals that are applied to motor 12 via output lines or conductors 52. Motor 12 is also coupled to system 10 via a ground conductor 54. Signal converting circuit 32 includes circuitry (not shown) for monitoring the output current of the drive signals applied to motor 12 through each phase conductor 52 and for generating current signals Ia, Ib, Ic representative thereof. These current signals are communicated to control circuit 34 as feedback for control of motor 12. In addition to the output current signals, signal converting circuit 32 may include circuitry (not shown) for detecting and monitoring other operating parameters of motor 12 or system 10, such as temperature.

Prior to operation, characteristic parameters relating to motor 12, such as rated currents, voltage, frequency, and the like are stored in control circuit 34 during a setup or programming sequence via input channels 46 or an input port 50. For the purposes of the present discussion, at least the following values are input during the setup of system 10: the base or rated voltage of motor 12, Vbase, the base or rated frequency of motor 12, Fbase, the rated full load current of motor 12, Ilim, the desired acceleration time from a stopped condition to the rated frequency, Taccel and the desired deceleration time from the rated frequency to a stopped condition, Tdecel. Because the synchronous rotational speed of motor 12 is directly proportional to the frequency of the signals driving it, where reference is made throughout this discussion to the frequency of signals, such as in setting desired frequency levels, it should be understood that such references are equally applicable to motor speed. During this setup sequence other operating parameters may be stored in control circuit 34, such as parameters relating to custom frequency/voltage relationships. Moreover, even after the initial configuration of control circuit 34, parameters and values input during such setup sequences may be accessed and modified as desired. Thereafter, control circuit 34 continuously cycles through a preset control routine, awaiting a signal from a command device, such as a start switch, to start motor 12. Once a start signal is received, control circuit 34 generates control signals based upon the parameters stored during setup and upon monitored values. These control signals generally direct signal converting circuit 32 to output drive signals in the form of pulse-width-modulated (PWM) waveforms of appropriate duty cycle, i.e. at a desired frequency and voltage, to drive motor 12 at a desired speed.

Figure 2:
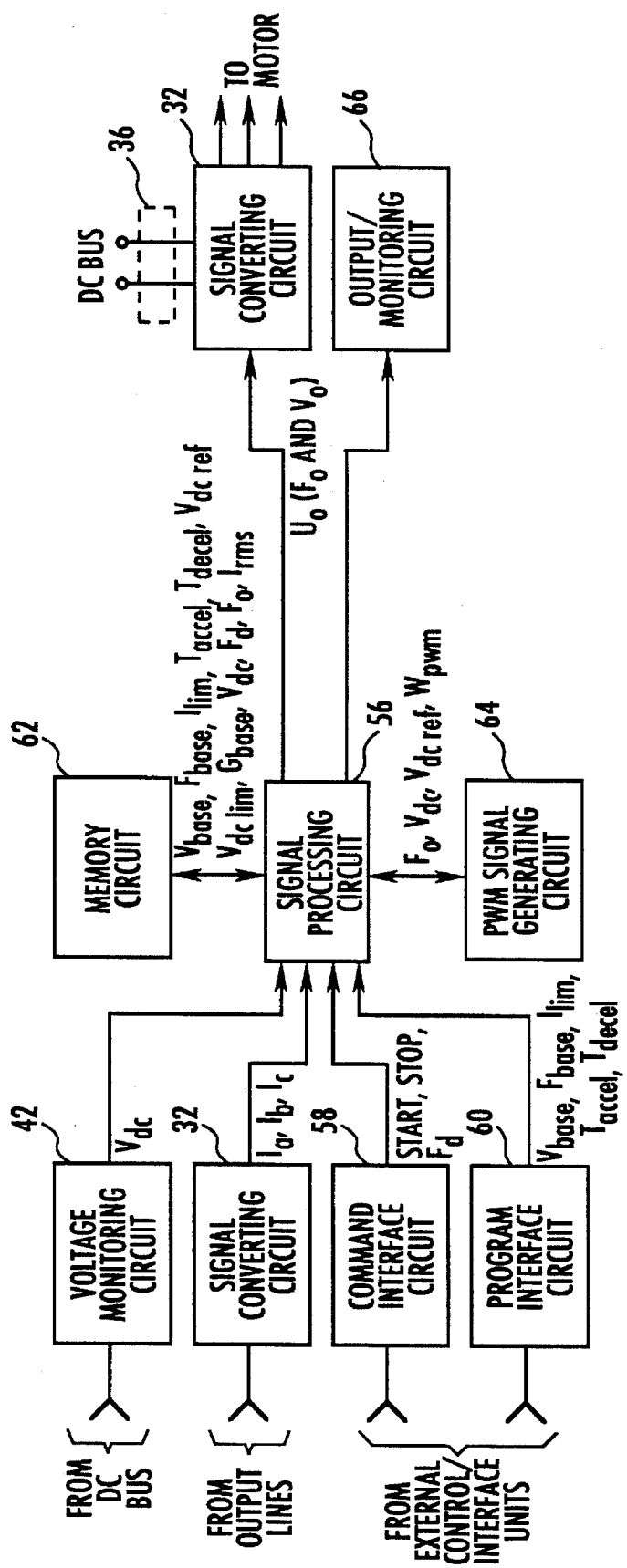
FIG. 2 is a signal flow diagram illustrating the how the various signals communicated to or produced in the control system are routed to obtain the desired motor speed control.

FIG. 2 illustrates the typical flow of signals among the various circuits of control system 10. Several additional circuits are represented in FIG. 2, including signal processing circuit 56, command interface circuit 58, program interface circuit 60, memory circuit 62, PWM signal generating circuit 64 and output/monitoring circuit 66. While these circuits are shown, for illustrative purposes, as distinct and separate circuits, it should be understood that they will typically be included within an appropriately configured (programmed) control circuit 34. As discussed above, voltage monitoring circuit 42 provides a signal Vdc representative of the DC bus voltage and applies this signal to signal processing circuit 56. Similarly, signal converting circuit 32 produces signals Ia, Ib, Ic representative of the current applied to motor 12 and applies these signals to signal processing circuit 56. Command interface circuit 58 receives command signals via input channels 46 or ports 50 and applies these signals to signal processing circuit 56. For purposes of the present discussion, these command signals include start signals, stop signals and a command frequency signal Fd representative of the desired operating speed of motor 12. Program interface circuit 60 operates during the setup sequence discussed above and provides signal processing circuit 56 with parameter values Vbase, Fbase, Ilim, Taccel and Tdecel.

In operation, signal processing circuit 56 receives these input signals and executes a preset control sequence stored in memory circuit 62 as discussed below. Based upon the input parameters, signal processing circuit 56 generates reference values including the DC bus nominal or reference voltage Vdc ref, the maximum allowable DC bus voltage Vdc lim and the motor base gain Gbase, obtained by dividing the base voltage by the base frequency. These values are communicated to and stored in memory circuit 62 along with the parameter values enumerated above. Moreover, throughout the control sequence signal processing circuit 56 generates a number of intermediate values, including the root-mean-squared current Irms, the output frequency Fo and the output voltage Vo of the drive signals applied to motor 12. Based upon the target output frequency Fo, PWM signal generating circuit 64 generates signals, designated Wpwm, defining the PWM waveform duty cycle required to obtain the desired output characteristics as will be described below. Finally, based upon this output frequency Fo, the output voltage Vo and the PWM waveform duty cycle, signal processing circuit 56 generates and applies control signals, designated generally Uo, and applies these signals to signal converting circuit 32 to drive motor 12.

Figure 3A:
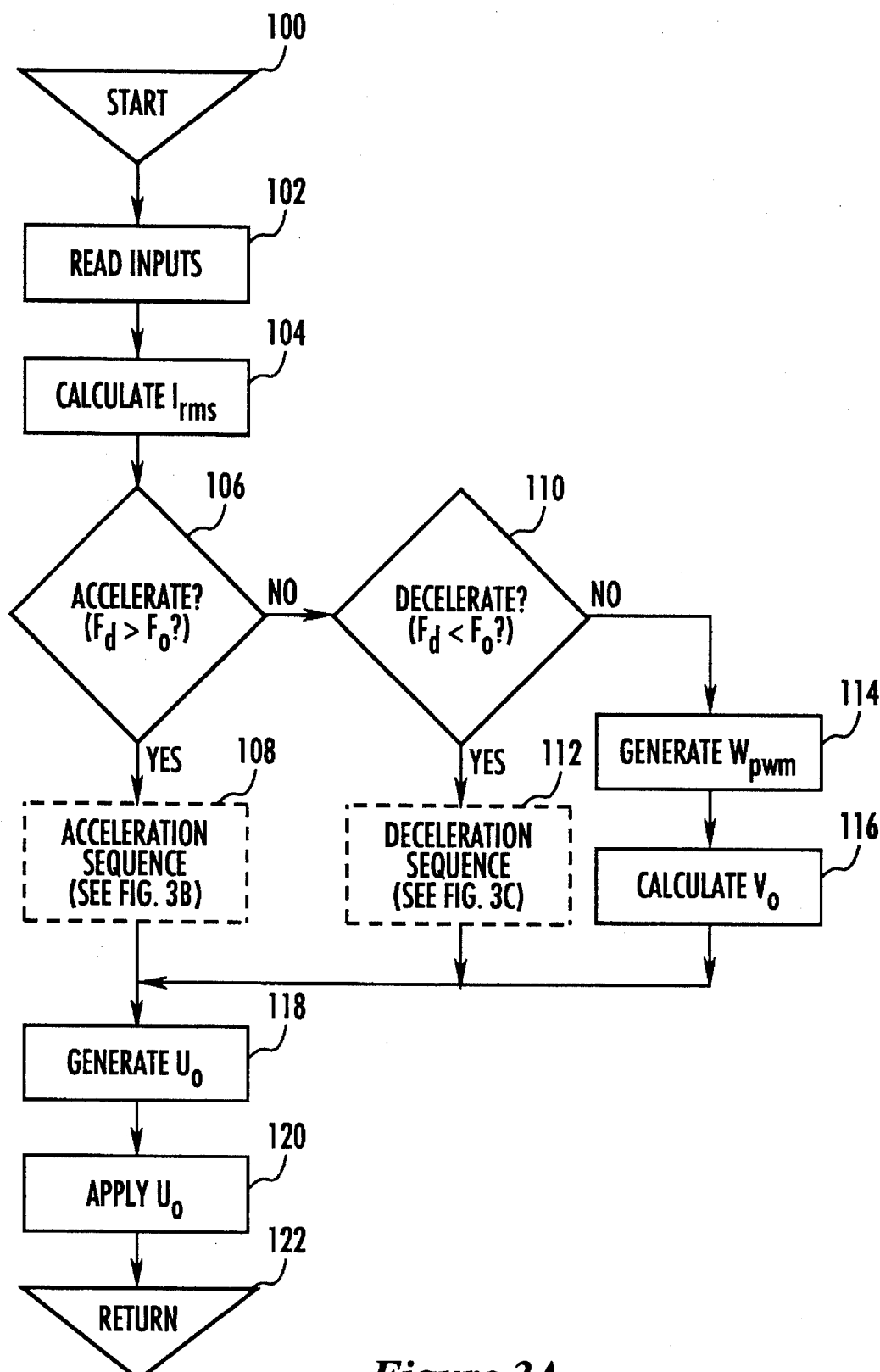
FIGS. 3A–3C are block diagrams generally illustrating a typical sequence of steps in control logic implementing the invention to control the speed of an electric motor.
Figure 3B:
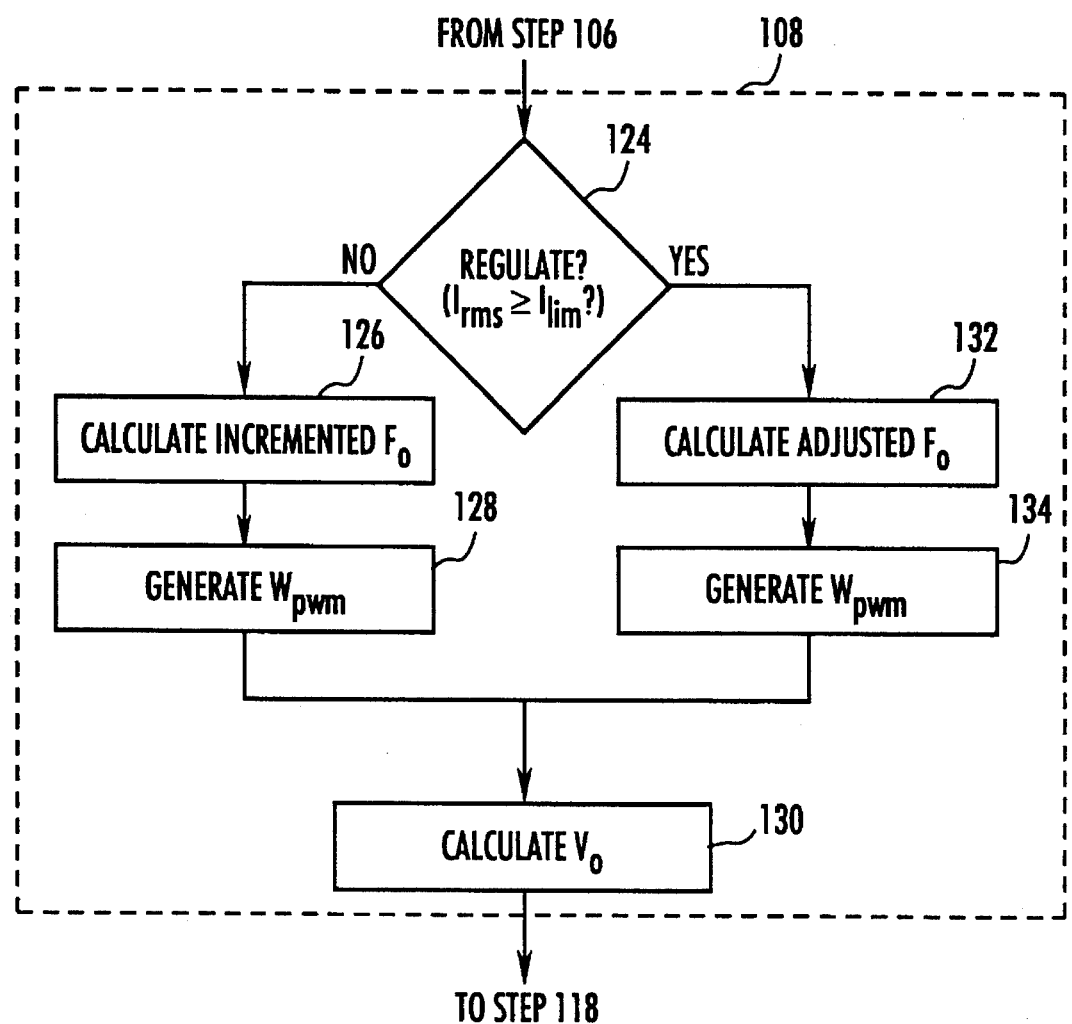
Figure 3C:
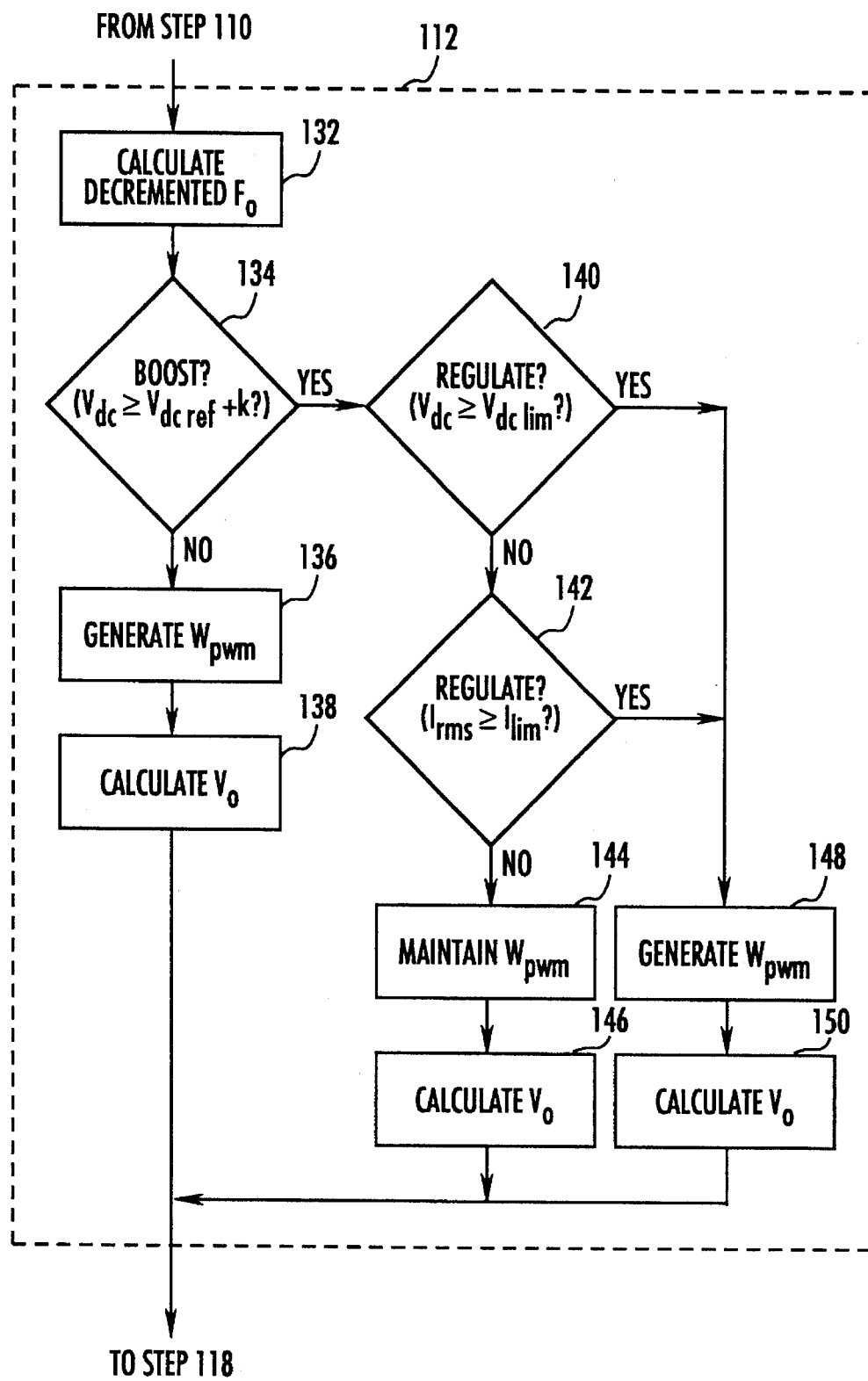

FIGS. 3A through 3C illustrate a typical flow of control logic for generating the control signals discussed above. Block 100 represents the starting point for the control routine through which control circuit 34 continuously cycles. At step 102 control circuit 34 accesses and reads the sensed parameters and control command inputs as discussed above. At step 104 signal processing circuit 56 converts the current values Ia, Ib and Ic to a root-mean-squared current value Irms. At step 106 signal processing circuit 56 determines whether desired or command frequency Fd is greater than the current output frequency Fo, indicating that motor 12 is to be accelerated. The response to block 106 will generally be affirmative when the motor is being started and when an increase in the command frequency has been made by an operator or other control source. When this is the case, signal processing circuit 56 advances to an acceleration sequence, designated generally at 108 (see FIG. 3B). When acceleration has not been commanded, the routine advances to step 110, where signal processing circuit 56 determines whether desired or command frequency Fd is less than the current output frequency Fo, indicating that motor 12 is to be decelerated. The response to this comparison will generally be affirmative when motor 12 has been commanded to stop or when a decrease in the command frequency has been made. When this is the case, signal processing circuit 56 advances to a deceleration sequence, designated 112 (see FIG. 3C).

When the responses to the comparisons in steps 106 and 110 are both negative, the control routine advances to step 114 where signal processing circuit 56 instructs PWM signal generating circuit 64 to develop a PWM voltage waveform suitable to provide an effective output voltage consistent with the preset voltage-to-frequency relationship, as a function of the then current value of Fo. In the presently preferred embodiment, the default voltage-to-frequency relationship is one of simple proportionality, following a line from a zero voltage and zero frequency (i.e. origin) to a maximum voltage, maximum frequency point at the rated voltage and frequency of motor 12. Other voltage-to-frequency relationships may also be envisioned depending upon particular characteristics of the load to which motor 12 is coupled. PWM signal generating circuit 64 generates the particular waveform signals Wpwm by generally known and well established algorithms, these signals being generally indicative of the PWM duty cycle required to produce the appropriate voltage levels and angles for each phase of motor 12. Moreover, at step 114 the waveform generated by PWM signal generating circuit 64 is adjusted to satisfy the relationship $$Wpwm \times Vdc/Vdc\ ref = 1 \tag{1}$$

PWM signal generating circuit 64 communicates this waveform signal to signal processing circuit 56, which at step 116 calculates the effective output voltage Vo in accordance with the relationship:

$$Vo = Gbase \times Wpwm \times (Vdc/Vdc\ ref) \times Fo \tag{2}$$

At step 118, signal processing circuit 56 generates control signals Uo for switching signal converting circuit 32 to provide the waveform duty cycle defined by Wpwm and voltage Vo, and at step 120 applies these control signals to circuit 32. In response to these control signals, signal converting circuit 32 reproduces the voltage waveform duty cycle Wpwm to drive motor 12. At step 122, the control routine returns or wraps to the initial step 100.

When the comparison made at step 106 indicates that motor 12 is to be accelerated, signal processing circuit 56 enters an acceleration sequence 108, the general steps of which are illustrated in FIG. 3B. As indicated at step 124, acceleration sequence 108 is designed to avoid overload or over-current tripping that could occur when system 10 attempts to accelerate motor 12 too fast (i.e. resulting from a short acceleration time Taccel) or when the load on motor 12 has increased. This is accomplished by regulating the rate of acceleration when the root-mean-square of the current, Irms, drawn by motor 12 approaches the motor current limit, Ilim. Accordingly, at step 124 signal processing circuit 56 determines whether Irms is equal to or greater than Ilim. If not, no regulation is required and circuit 56 proceeds to step 126, where the output frequency Fo for the current control routine cycle is incremented. In the presently preferred embodiment, Fo is incremented an by a constant amount in each control cycle, determined by dividing the frequency output range (from zero to the rated frequency) by the programmed acceleration time Taccel. However, other acceleration profiles could be envisioned. At step 128, PWM signal generating circuit 64 generates the PWM waveform required as outlined above. Based upon this waveform signal, signal processing circuit 56 calculates the effective output voltage at step 130, in accordance with equation (2) above. Thereafter, the routine reverts back to steps 118, 120 and 122 discussed above.

If at step 124 signal processing circuit 56 determines that Irms is equal to or exceeds Ilim, circuit 56 proceeds to step 132 where the output frequency is adjusted to maintain an acceptable output current level and thus avoid tripping. In the presently preferred embodiment, when such regulation is required circuit 56 reduces the output frequency Fo to maintain an acceptable current level (i.e. below the trip current). At step 134 PWM signal generating circuit 64 generates the appropriate waveform as described above and, based upon this waveform and upon the new value of Fo, signal processing circuit 56 calculates the effective output voltage Vo at step 130 in accordance with equation (2). From this point, the routine again returns to steps 118, 120 and 122.

When the comparison made at step 110 indicates that motor 12 is to be decelerated, signal processing circuit 56 enters deceleration sequence 112, illustrated generally in FIG. 3C. At step 132, signal processing circuit 56 calculates the output frequency Fo for the current control cycle by decrementing the frequency from the previous cycle by an amount determined by the preset deceleration time Tdecel. As in the acceleration sequence, while various deceleration profiles may be envisioned, in the presently preferred embodiment, Fo is decremented by a constant amount in each control cycle, determined by dividing the frequency output range (from zero to the rated frequency) by the programmed deceleration time Tdecel. Once this frequency is determined, circuit 56 advances to step 134 where the current DC bus voltage is compared to the DC bus reference voltage plus a predetermined constant k. Because in decelerating a primarily inertial load motor 12 tends to slow at a rate less than that of the desired deceleration rate, motor 12 effectively acts as a power generator and produces power that is transmitted to DC bus 36. In conventional drive systems this power may be dissipated by a braking resistor to slow motor 12. However, the presence of capacitive circuit 30 enables system 10 to store energy produced during such deceleration, resulting in a rise in the DC bus voltage above the reference voltage Vdc ref. Moreover, while in steady state operation or during acceleration the PWM waveform duty cycle is modulated to maintain the relationship expressed in equation (1), during deceleration of an inertial load the DC bus voltage is allowed to rise, thereby providing additional voltage to motor 12. Thus, at step 134, when the DC bus voltage rises slightly (the amount expressed by the constant k) above the DC reference voltage during deceleration, control system 10 enters into a "deceleration boost" phase described below. If the response to the comparison at step 134 is negative, signal processing circuit 56 advances to step 136 where PWM signal generating circuit 64 is instructed to generate the voltage waveform in accordance with equation (1). Based upon this waveform duty cycle, again expressed in the value Wpwm, signal processing circuit 56 calculates the effective output voltage Vo at step 138, then reverts to step 118 to generate and apply corresponding control signals.

If the comparison at step 134 indicates that the motor load is primarily inertial, that is, that motor 12 is tending to slow at a rate less than the desired rate, signal processing circuit 56 advances to step 140. At step 140, the current DC bus voltage Vdc is compared to the maximum allowable DC bus voltage Vdc lim. When the DC bus voltage is found to equal or exceed the maximum allowable voltage, system 10 regulates the rise in the DC bus voltage by proceeding to step 148 as discussed below. When this comparison indicates that the maximum allowable DC bus voltage has not yet been reached, the routine proceeds to step 142. At step 142 the root-mean-squared current Irms is compared to the maximum allowable current Ilim. When this comparison indicates that the current limit has been reached, the routine proceeds to step 148 as discussed below. When the current limit has not been reached, circuit 56 advances to step 144. As mentioned above, while during other phases of operation signal processing circuit 56 commands a PWM waveform to be generated to maintain the relationship expressed in equation (1), during this deceleration boost phase the PWM waveform duty cycle is maintained at its current level at step 144, resulting in an increase in the output voltage Vo proportional to the increase in the DC bus voltage in accordance with equation (2). At step 146 this resultant output voltage is calculated. Thereafter, signal processing circuit 56 again returns to step 118, generating and applying control signals to signal converting circuit 32.

When either the voltage comparison at step 140 or the current comparison at step 142 indicates that a limit has been reached (by an affirmative response at either step), control system 10 regulates the drive signals applied to motor 12 to avoid overload or overcurrent tripping. Thus, at step 148, rather than maintaining the PWM waveform duty cycle and thereby causing further increase in the DC bus voltage or output current, a new PWM waveform duty cycle is calculated by PWM signal generating circuit 64. In doing so, PWM signal generating circuit 64 will generally not respect the relationship provided in equation (2), but will calculate a waveform having a duty cycle necessary to maintain the elevated output voltage level present when the limit (i.e. voltage or current limit) was reached. When the DC bus voltage limit is detected at step 140, this value will be the DC bus voltage limit Vdc lim. On the other hand, when the current limit is reached before the DC bus voltage limit is reached, which will typically occur when the frequency from which the deceleration starts is less than the rated or base frequency Fbase, the value of Vdc n will be less than the DC voltage limit. At step 150 signal processing circuit determines the resulting output voltage Vo, and then reverts back to step 118.

The deceleration boost phase described above generally results in an increase in the non-torque producing losses in motor 12, tending to brake the motor and thereby to maintain the desired deceleration rate. In subsequent cycles through the control routine, as long as the DC bus voltage remains greater than the DC bus reference voltage, control system 10 will apply an output voltage to motor 12 elevated with respect to the level otherwise dictated by the voltage-to-frequency relationship used for control. Furthermore, this voltage will be increased until either the DC bus voltage limit or the current limit is reached.

Figure 4:
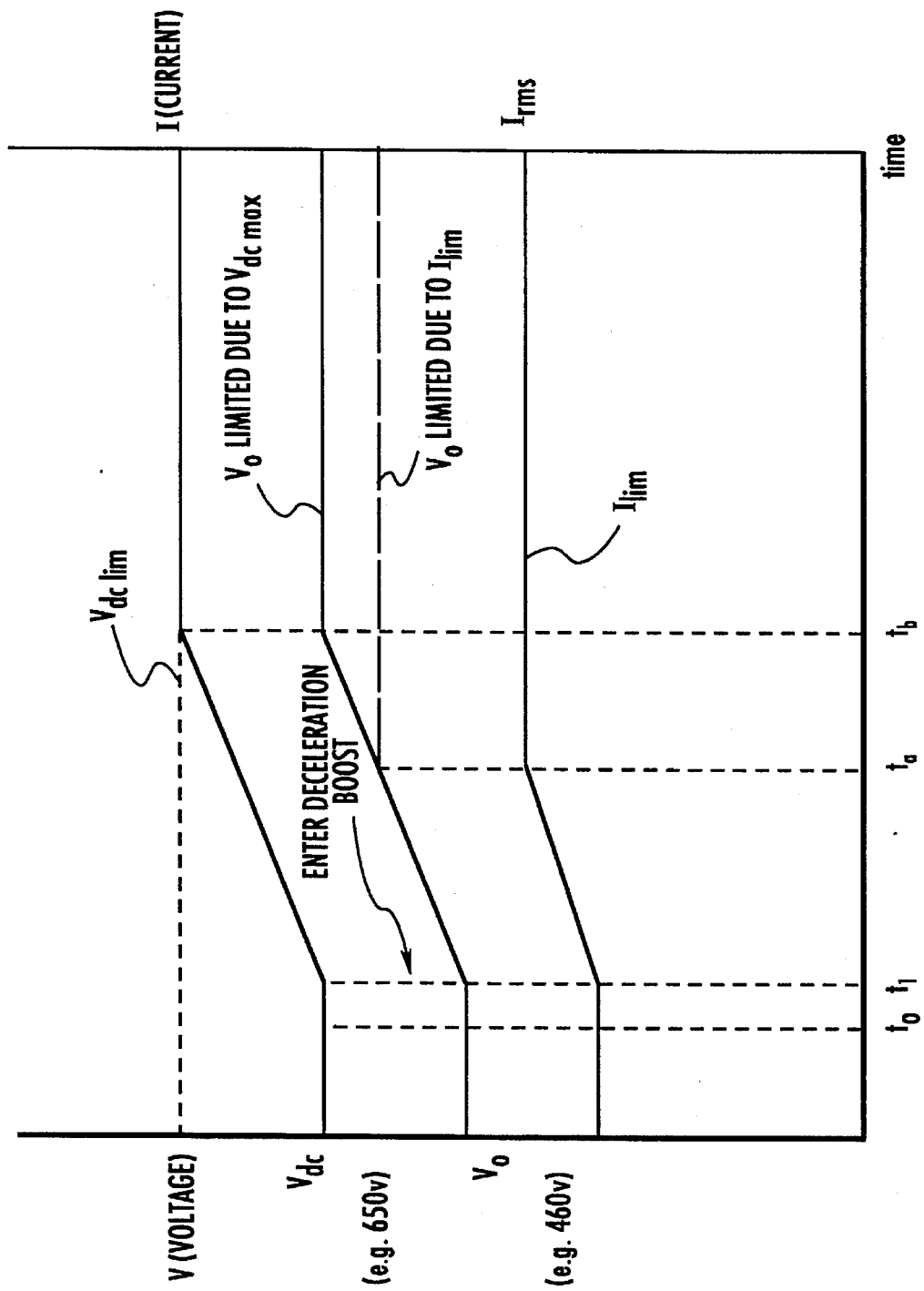
FIG. 4 is a graphical representation of exemplary voltage, current, speed and frequency levels versus time during deceleration of an electric motor in accordance with the invention.

The operation of control system 10 during this deceleration boost phase is illustrated graphically in FIG. 4. When a deceleration or stop command is received by control system 10 at time t0, the output frequency Fo is decremented to slow motor 12. When the load coupled to motor 12 is primarily intertial, a short time after beginning deceleration, at time t1, the DC bus voltage begins to rise from its steady state level (generally Vref). Because the PWM waveform duty cycle is not adjusted to compensate for this rise, the output voltage Vo and the output current Irms rise as well. This rise continues, tending to brake motor 12 until either the current limit Ilim or the DC bus voltage limit Vdc lim is reached, as illustrated at times ta and tb respectively. Once these limits are reached, the DC bus voltage and output voltages are maintained at their elevated levels by adjusting the PWM waveform duty cycle accordingly.

I claim:

1. A variable frequency drive for an alternating current electric motor, the drive comprising:

a signal converting circuit having input lines couplable to a direct current source and output lines couplable to the electric motor, the signal converting circuit generating variable frequency and variable voltage output signals to drive the motor at desired speeds;

a capacitive circuit coupled across the input lines, the capacitive circuit storing energy produced by the motor;

a voltage monitoring device coupled across the input lines, the voltage monitoring device measuring the voltage difference between the input lines; and a control circuit coupled to the signal converting circuit and to the monitoring device, the control circuit monitoring the voltage difference measured by the monitoring device and controlling the rate of deceleration by generating and applying control signals to the signal converting circuit to increase the voltage of the output signals when the voltage difference rises above a predetermined level during deceleration.

2. The drive of claim 1, wherein the direct current source is a rectifying circuit coupled to a source of alternating current power.

3. The drive of claim 1, wherein the signal converting circuit is configured to generate drive signals for three separate phases.

4. The drive of claim 3, wherein the control circuit includes a PWM signal generating circuit, the PWM signal generating circuit producing signals defining a pulse-width-modulated waveform having a duty cycle proportional to the desired output voltage in the drive signals.

5. A method for decelerating an electric motor coupled to a control system, the control system including a DC bus coupled to a direct current source, a signal converting circuit coupled to the direct current bus for generating drive signals to drive the motor, a capacitive circuit coupled to the DC bus for storing energy produced by the motor, a monitoring circuit coupled to the DC bus for measuring the DC bus voltage and a control circuit coupled to the monitoring circuit and to the signal converting circuit, the control circuit generating control signals and applying the control signals to the signal converting circuit for selectively controlling the frequency and voltage of the drive signals, the method comprising the steps of:

monitoring the DC bus voltage;

reducing the frequency of the drive signals to decelerate the motor;

increasing the voltage of the drive signals in response to an increase in the DC bus voltage above a predetermined level.

6. The method of claim 5, wherein, prior to decelerating the motor, the control signals produced by the control circuit are based upon pulse-width-modulated waveforms having duty cycles appropriate to maintain a predetermined voltage-to-frequency relationship in the drive signals.

7. The method of claim 6, wherein, during deceleration of the motor, the control signals produced by the control circuit are based upon pulse-width-modulated waveforms having duty cycles appropriate to maintain an output voltage elevated with respect to the voltage dictated by the predetermined relationship.

8. The method of claim 5, wherein the voltage of the drive signals is progressively increased until a predetermined current limit of the motor is reached, after which the voltage of the drive signals is maintained at a relatively constant level until the DC bus voltage drops below a second predetermined level.

9. The method of claim 5, wherein the voltage of the drive signals is progressively increased until a predetermined maximum DC bus voltage is reached, after which the voltage of the drive signals is maintained at a relatively constant level until the DC bus voltage drops below a second predetermined level.

10. A method for controlling the speed of an electric motor coupled to a control system, the control system including a signal converting circuit for generating drive signals in response to control signals and for applying the drive signals to the motor, a monitoring circuit for detecting and measuring an input voltage to the signal converting circuit and producing a parameter signal representative thereof and a control circuit coupled to the signal converting circuit and to the monitoring circuit, the control circuit generating control signals and applying the control signals to the signal converting circuit for selectively controlling the frequency and voltage of the drive signals, the method comprising the steps of:

(a) reducing the frequency of the drive signals at a predetermined rate to decelerate the motor;

(b) monitoring the parameter signal; and (c) increasing the voltage of the drive signals when the parameter signal indicates that the motor is tending to decelerate at a rate less than the predetermined rate.

11. The method of claim 10, wherein the signal converting circuit is coupled to a source of DC power via a DC bus and the parameter monitored by the monitoring circuit is the DC bus voltage.

12. The method of claim 10, wherein, prior to step (c), the control signals produced by the control circuit are based upon pulse-width-modulated waveforms having duty cycles appropriate to maintain a predetermined voltage-to-frequency relationship in the drive signals.

13. The method of claim 12, wherein, during step (c), the control signals produced by the control circuit are based upon pulse-width-modulated waveforms having duty cycles appropriate to maintain an output voltage elevated with respect to the voltage dictated by the predetermined relationship.

14. The method of claim 10, wherein the signal converting circuit is coupled to a source of DC power via a DC bus and wherein the voltage of the drive signals is progressively increased until a predetermined current limit of the motor is reached, after which the voltage of the drive signals is maintained at a relatively constant level until the DC bus voltage drops below a second predetermined level.

15. The method of claim 10, wherein the signal converting circuit is coupled to a source of DC power via a DC bus and wherein the voltage of the drive signals is progressively increased until a predetermined maximum DC bus voltage is reached, after which the voltage of the drive signals is maintained at a relatively constant level until the DC bus voltage drops below a second predetermined level.

* * * * *